Nov. 5, 1946.                    F. J. McMICHAEL                    2,410,515
                                 BOX DUMPING MACHINE
                                 Filed Dec. 14, 1944                 5 Sheets-Sheet 1

Inventor
F. J. McMichael
By Thos. N. Johnston
            Attorney

Nov. 5, 1946.　　　F. J. McMICHAEL　　　2,410,515
BOX DUMPING MACHINE
Filed Dec. 14, 1944　　　5 Sheets-Sheet 2

Inventor
F. J. McMichael
By Thos. H. Johnston
Attorney

Nov. 5, 1946.  F. J. McMICHAEL  2,410,515
BOX DUMPING MACHINE
Filed Dec. 14, 1944  5 Sheets-Sheet 3
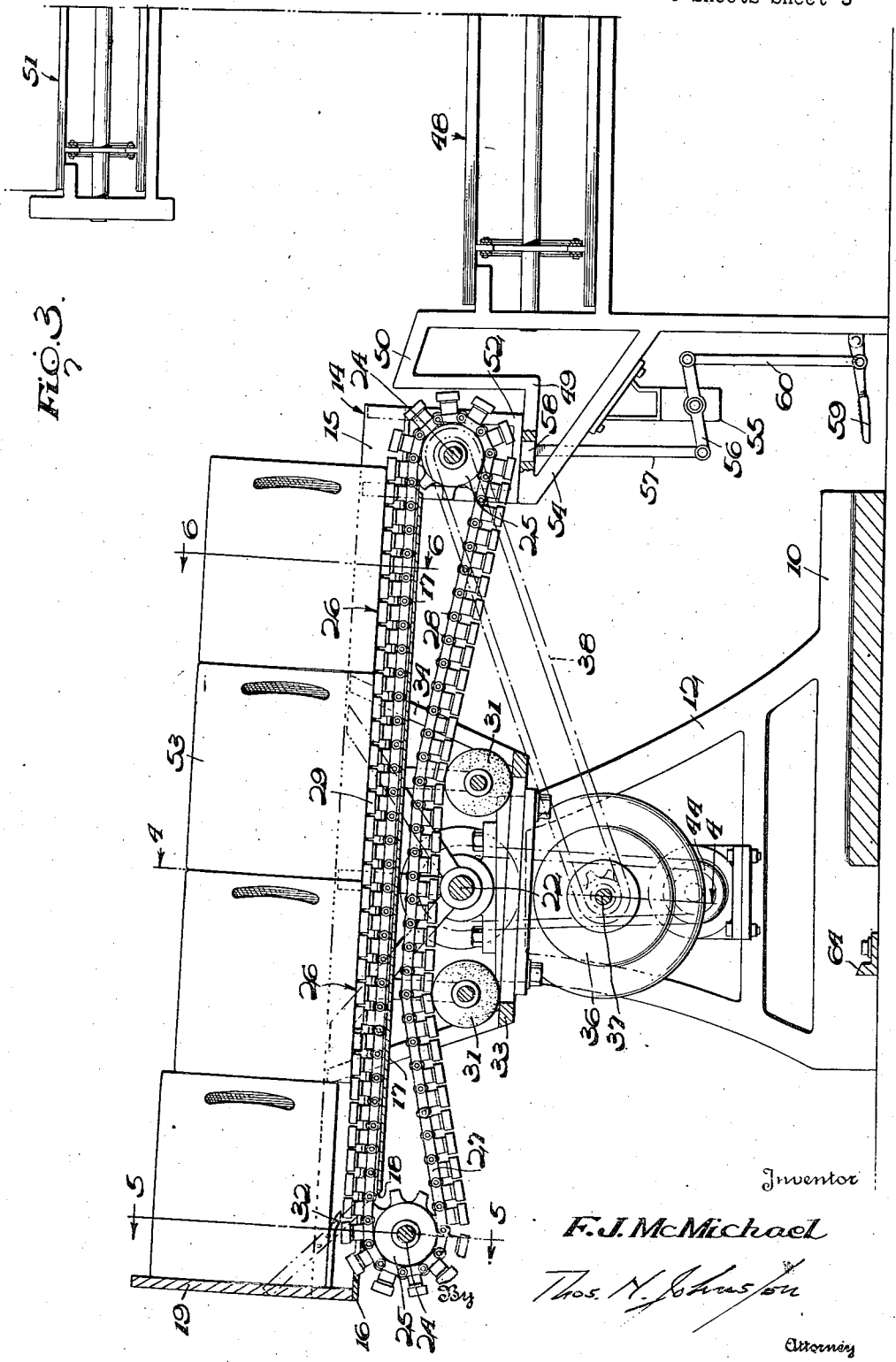
Inventor
F. J. McMichael
By Thos. N. Johnston
Attorney Nov. 5, 1946.  F. J. McMICHAEL  2,410,515
BOX DUMPING MACHINE
Filed Dec. 14, 1944  5 Sheets-Sheet 4
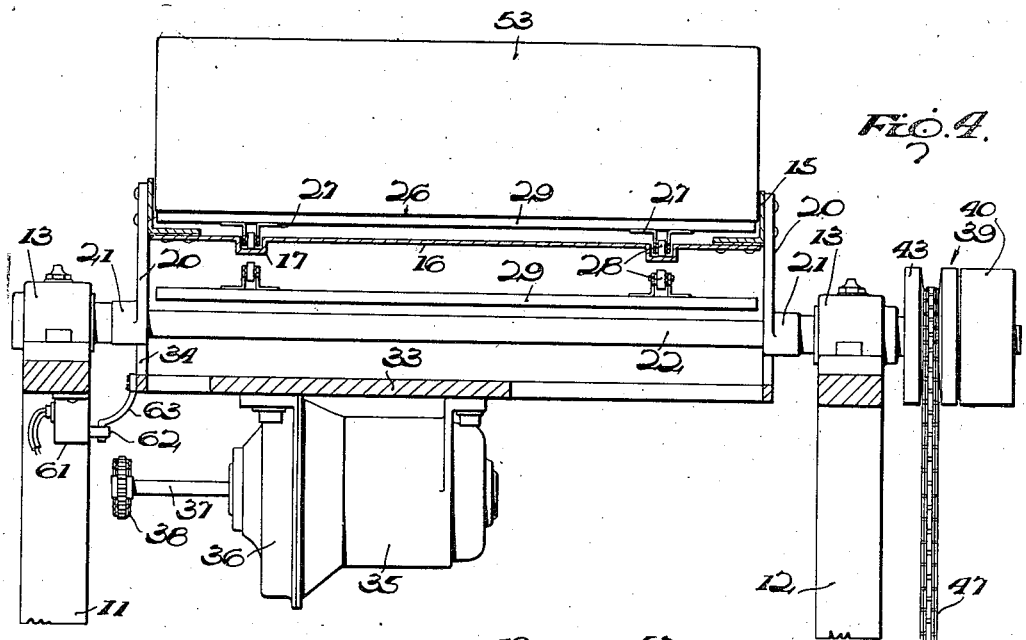
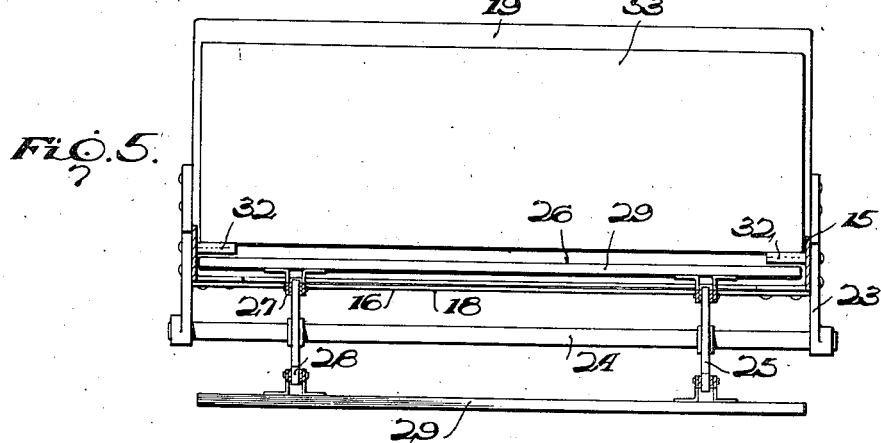
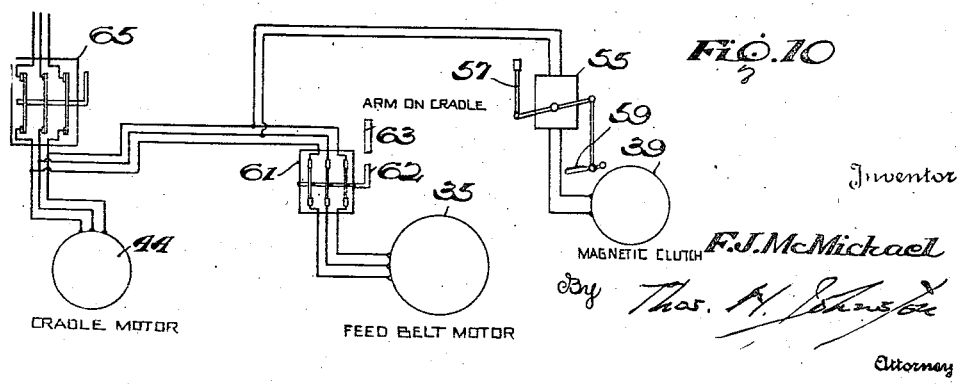
Inventor
F. J. McMichael
By Thos. A. Johnson
Attorney

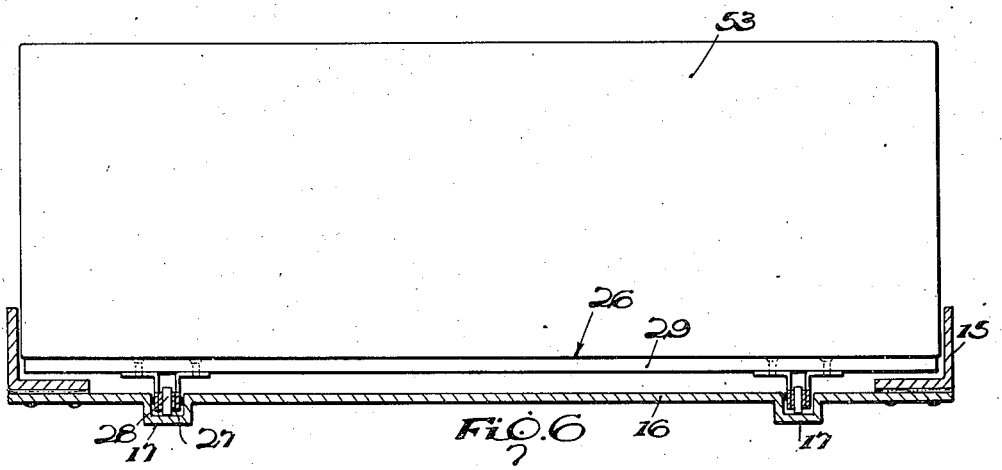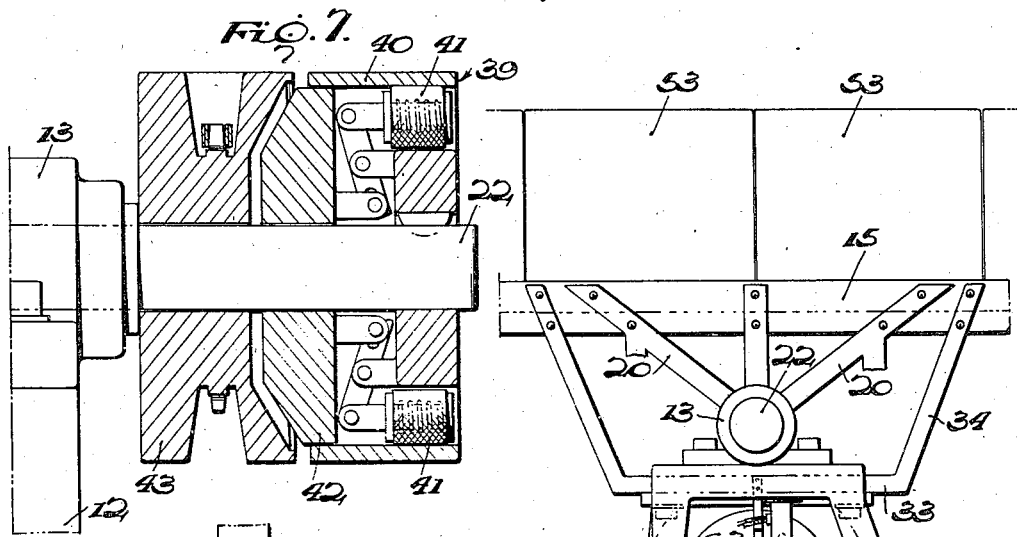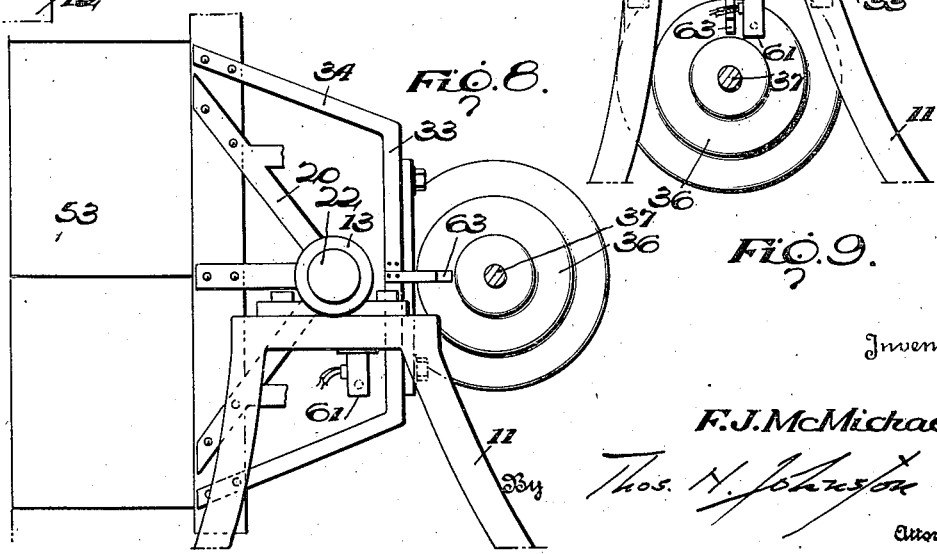

Patented Nov. 5, 1946

2,410,515

UNITED STATES PATENT OFFICE 2,410,515

BOX DUMPING MACHINE

Floyd J. McMichael, Orlando, Fla.

Application December 14, 1944, Serial No. 568,156

2 Claims. (Cl. 214—1.1)

This invention relates to an improved box dumping machine.

In the handling of citrus fruit and the like, it is customary to place the fruit, as it is being picked, in field boxes, when said boxes are arranged in stacks, after which the stacks are hauled to the processing plant and handled as such until the time arrives for the boxes to be emptied one by one and the fruit dumped for the processing thereof. The work of lifting the boxes and emptying the fruit out of the boxes one by one at the plant is very strenuous, so much so that the workmen find it necessary to rest at intervals and other workmen are required to replace them at the dumping belt. As a result, such workmen usually receive a higher rate of pay. To meet the situation, machines employing a vertical elevator belt and a cooperating, horizontal dumping belt have heretofore been devised for raising and dumping a stack of boxes, but in so far as I am aware, no such machine has come into general use, largely because of the fact that unless the boxes are stacked in more or less accurate registry, the box or boxes of the stack out of register catch in the dumping mechanism of the machine with the result that the boxes are broken and the fruit injured.

It is accordingly an object of the invention to provide a machine wherein a stack of boxes on the machine will be rocked to dumping position, as contrasted with being raised by a belt, while the belt employed will serve only to feed the tilted boxes forwardly to be emptied, so that neither the boxes nor the fruit will be injured.

A further object of the invention is to provide a machine wherein, at each operation, the machine will rock a stack of boxes and dump them one by one so that the attendant will be relieved of all work except the handling of the empty boxes, and wherein a single attendant may, while either of two machines standing side by side is being loaded, attend to the rocking and dumping of a stack of boxes by the other machine, to the end that a less number of attendants will be required and these attendants will receive the standard rate of pay.

Another object of the present invention is to provide a machine wherein the feed belt employed will remain stationary while the machine is being loaded so that a stack of boxes on the machine will not be tipped over backwards by the belt, regardless of how accurately or inaccurately the boxes may be stacked.

Still another object of the invention is to provide a machine embodying a cradle which will normally stand in upright loading position so that the cradle may be loaded with a stack of boxes, and wherein, at the instigation of the attendant, the cradle may then be rocked to substantially horizontal dumping position, when the boxes will be dumped in sequence.

Another object of the invention is to provide a machine wherein, as the cradle approaches horizontal dumping position, the feed belt will be automatically started into operation for feeding the boxes forwardly to be dumped.

And a still further object of the invention is to provide a machine wherein, as the cradle reaches the end of its throw to substantially horizontal dumping position, the means employed for rocking the cradle to dumping position will be automatically cut off so that the cradle may stand in dumping position under the weight of the boxes thereon, wherein the cradle will, when the boxes have been dumped and removed from the cradle, return by gravity to upright loading position, and wherein the feed belt will be automatically stopped as the cradle returns to loading position.

Other and incidental objects of the invention will appear during the course of the following description, and in the drawings:

Figure 3 is a vertical longitudinal section showing the cradle in substantially horizontal dumping position.

Figure 4 is a fragmentary transverse section on the line 4—4 of Figure 3.

Figure 5 is a transverse section on the line 5—5 of Figure 3.

Figure 6 is a transverse section on the line 6—6 of Figure 3.

Figure 7 is a detail section of the magnetic clutch employed.

Figure 8 is a diagrammatic detail showing the trip arm and switch employed for controlling the actuation of the feed belt of the cradle and illustrating the position of the trip arm when the cradle is in loading position.

Figure 9 is a diagrammatic detail showing the position of the trip arm when the cradle is in dumping position.

Figure 10 is a diagrammatic view of the switches and circuits employed.

Figure 1:
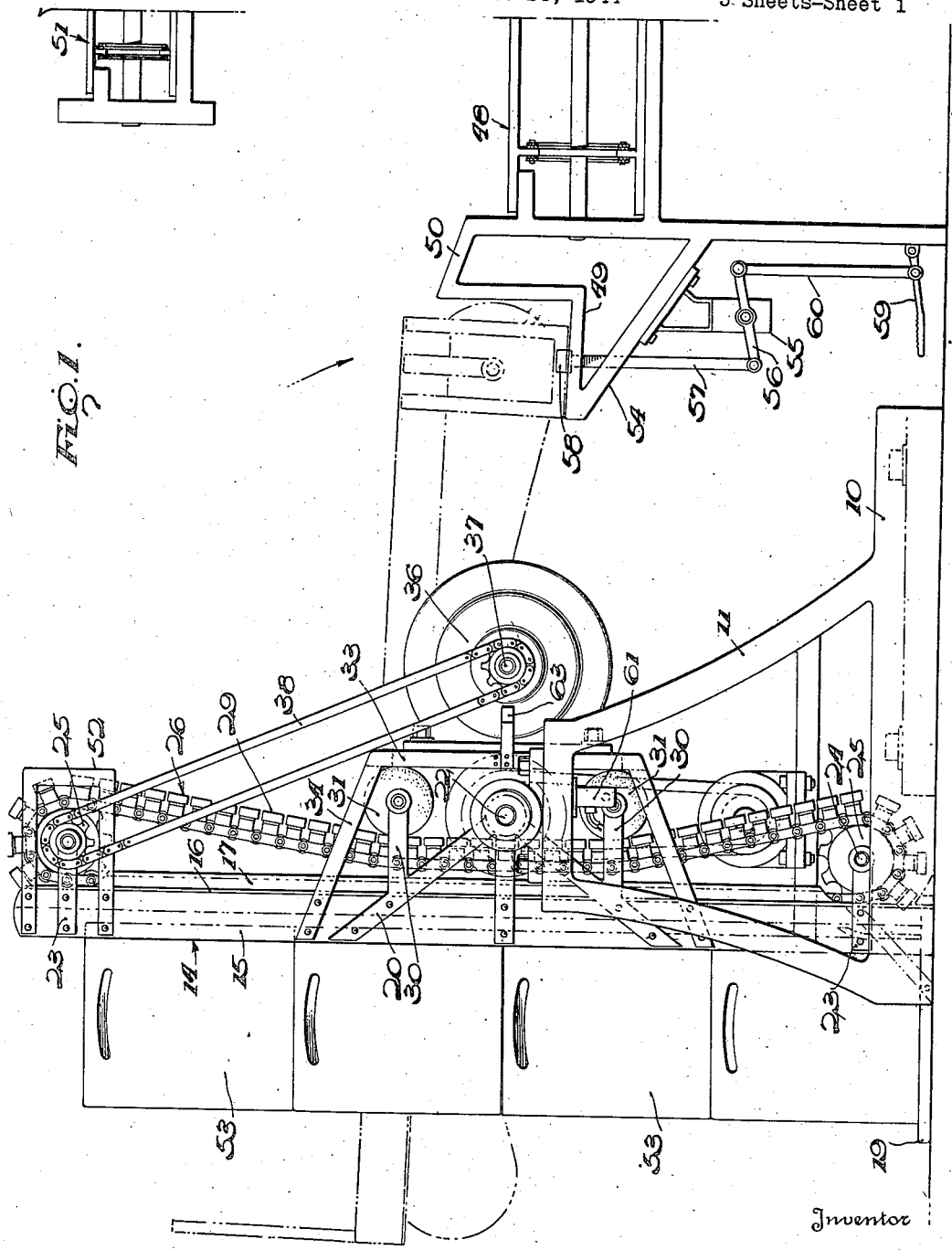
Figure 1 is a side elevation of my improved dumping machine, and showing the cradle of the device in upright loading position.

In carrying the invention into effect, I employ a stand 10 having spaced pedestals 11 and 12 respectively, and fixed to said pedestals are bearings 13. Mounted to rock upon the stand is a cradle, indicated as a whole at 14.

As particularly brought out in Figure 6 of the drawings, the cradle 14 includes a frame embodying spaced parallel side bars 15, and fixed to the bottom flanges of said bars is a bottom plate 16 in which are provided spaced parallel channels 17. Formed in the plate near the lower end of the frame, as shown in Figure 3, as well as in the bottom flanges of the side bars 15 is a transverse slot 18, and extending at a right angle to the bottom plate at the lower end of the frame is a fixed foot plate 19. Fixed to the side bars of the frame medially thereof are brackets 20 having aligned sleeves 21, and fixed in said sleeves is a cross shaft 22 journaled at its ends in the bearings 13 of the stand 10. The cradle 14 is thus mounted to rock upon the stand and may be swung by turning the shaft 22.

Fixed to the side bars 15 of the frame of the cradle 14 near the ends of said bars are pairs of bearing plates 23, and journaled by said plates are sprocket shafts 24 upon which are mounted pairs of sprockets 25 carrying a feed belt, indicated as a whole at 26. The belt 26 comprises sprocket chains 27 which are trained about the sprockets 25 and, as best shown in Figure 6, the links of the chains carry rollers 28 which travel in the channels 17 of the bottom plate 16 of the cradle, while to opposite links of the two chains are secured cross slats 29. As brought out in Figure 3 of the drawings, the belt is received through the slot 18 of the bottom plate so that the belt is thus mounted to travel around the plate above said slot and, of course, the rollers 28 will sustain weight imposed upon the upper reach of the belt. Projecting from the shaft brackets 20 are pairs of arms 30, and supported by said arms are spaced idler rollers 31, the shafts of which are journaled by the arms. As will be observed, these rollers guide the lower reach of the belt over the shaft 22.

Fixed to the lower ends of the side bars 15 of the frame of the cradle 14 are stop bars 32 which upstand from the foot plate 19 in front of the belt 26 and are preferably curved at their upper end portions toward the belt. The purpose of these bars will presently appear.

Extending at the rear of the shaft 22 of the cradle 14, as best shown in Figures 1 and 4 of the drawings, is a shelf 33, and extending from the ends of said shelf are diverging straps 34 which straddle said shafts and are fixed to the side bars 15 of the cradle frame. Mounted upon said shelf is a motor 35 which embodies a suitable reduction gear unit 36, and extending from said unit is a driven shaft 37. Extending between said shaft and the sprocket shaft 24 at the upper end of the cradle is a chain 38 for driving the feed belt 26.

Mounted upon one end of the shaft 22 of the cradle 14 is a magnetic clutch, indicated as a whole at 39. This clutch may be of any conventional character. However, in order to afford a better understanding of the operation of the clutch, I have shown the device in partial detail in Figure 7 of the drawings.

As will be observed, the clutch 39 includes a casing 40 which is fixed to the shaft 22, and mounted within the casing are solenoids 41 operatively connected with a spring-retracted clutch disk 42 mounted to turn with the casing and operable by said solenoids to engage a sprocket pulley 43 free on the shaft. Thus, when the clutch is energized, the pulley 43 will be connected with the shaft 22 for turning said shaft while normally, the pulley may turn free on the shaft.

Figure 2:
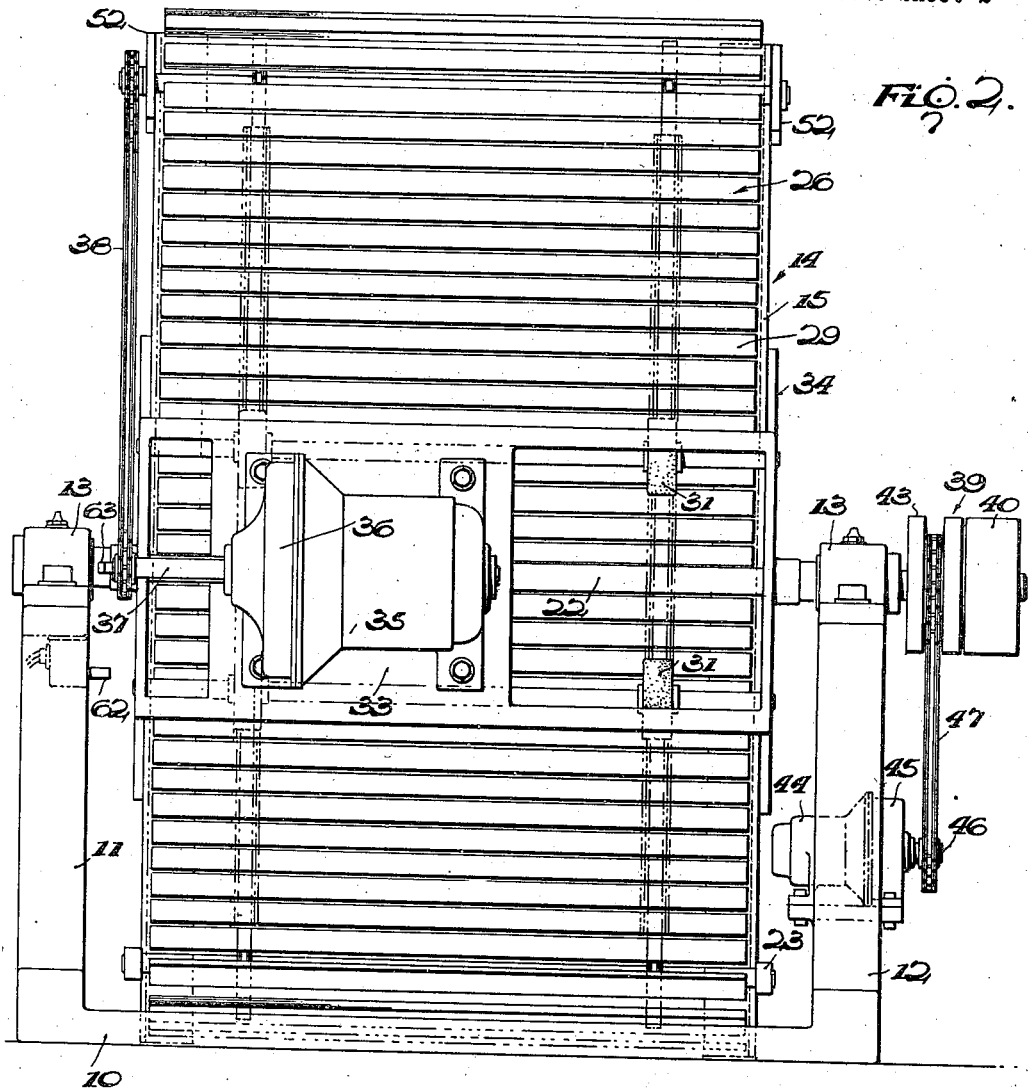
Figure 2 is a rear elevation of the machine.

Mounted upon the pedestal 12 of the stand 10, as best seen in Figure 2 of the drawings, is a motor 44 which embodies a suitable reduction gear unit 45, and extending from said unit is a driven shaft 46. Connecting said shaft with the pulley 43 of the clutch 39 is a drive chain 47. Accordingly, while the motor 44 is in operation, the motor will turn said pulley on the shaft 22 of the cradle 14 while, when the clutch 39 is energized, the motor will swing the cradle.

In practice, the present machine will be arranged adjacent the usual fruit conveyor of a processing plant, and in the drawings I have conventionally shown such a conveyor at 48. In accordance with the present invention, however, the conveyor 48 is provided with a shelf 49 above which is disposed an apron 50 sloping toward the conveyor belt. Arranged above the conveyor 48 is the usual empty box conveyor, conventionally shown at 51.

Mounted upon the upper ends of the side bars 15 of the frame of the cradle 14 are legs 52, and it is now to be observed that the cradle will normally stand in substantially vertical loading position, as shown in Figure 1 of the drawings, but may, as shown in Figure 3, be swung to substantially horizontal dumping position, when the legs 52 will rest upon the shelf 49 for supporting the cradle to slightly incline downwardly toward its forward end. I have shown a stack of conventional boxes 53 on the cradle 14 and, as will be observed, when the cradle is in dumping position, the boxes are supported by the belt 26 for movement onto the apron 50.

The shelf 49 of the conveyor 48 is provided with a bracket 54, and mounted thereon is a suitable switch 55 having a lever 56. Extending from the forward end of said lever is a rod 57 which is slidably received through said shelf and is provided with a head 58. Mounted upon the conveyor 48 beneath the switch 55 is a foot lever 59, and connecting said lever with the rear end of the switch lever 56 is a rod 60. As brought out in Figure 3 of the drawings, the head 58 of the rod 57 is disposed for engagement by one of the legs 52 of the cradle 14. Accordingly, as the cradle approaches dumping position, said leg will depress the rod and actuate the lever 56 so that the switch 55 will be automatically moved to open position, in which position the switch will normally stand.

Mounted upon the pedestal 11 of the stand 10 is a suitable switch 61 which, as seen in Figure 4 of the drawings, is provided with a lever 62, and fixed to the adjacent end of the shelf 33 is a trip arm 63, the free end of which is disposed to engage said lever. In Figure 8 of the drawings, I have shown the relative position of the parts when the cradle 14 is in normal, upright loading position, while, in Figure 9, the relative position of the parts is shown when the cradle is in dumping position. In this connection, it should be noted that the cradle is so balanced that when in dumping position, as seen in Figure 3, and the boxes 53 have been emptied and removed therefrom, the cradle will automatically return by gravity to upright loading position. Preferably, a stop 64 is provided for limiting the cradle in its return throw.

The circuits employed in connection with the electrical units previously described are shown in Figure 10 of the drawings, all of said circuits being controlled by a master switch 65. As will be observed, the motor 44 for rocking the cradle 14 will operate continuously while the switch 65 is closed. The switch 61 is interposed in the circuit of the motor 35 which operates the feed belt 26 of the cradle 14, and the switch 55 is interposed in the circuit of the magnetic clutch 39 which controls the actuation of the cradle.

Assuming now that the cradle 14 is standing in upright position, as shown in Figure 1, the stack of boxes 53 is loaded on the foot plate 19 and, as will be noted, the lowermost box of the stack will abut the stop bars 32 for spacing the stack away from the feed belt 26. The purpose of said bars thus becomes clear and, as will be appreciated, said bars will prevent the stack of boxes from being jammed by a careless workman against the belt. Moreover, it is to be noted that when the cradle is in loading position, the belt is stationary, as will be explained, so that regardless of whether or not the boxes are accurately stacked, the belt will not catch on one of the boxes to tip the stack over with resultant injury to the boxes or the fruit therein.

The cradle 14 having been loaded, the attendant then depresses the foot pedal 59 and closes the switch 55, whereupon the magnetic clutch 39 is energized with the result that the motor 44 starts to rock the cradle to dumping position, as shown in Figure 3. As previously noted, the motor 44 will operate continuously while the master switch 65 is closed.

As the cradle is swung toward dumping position, the trip arm 63 will encounter the switch lever 62 with the result that the motor 35 will be energized, whereupon the feed belt 26 will be set into operation. The tilting of the cradle toward the horizontal will, of course, cause the boxes 53 of the stack to gravitate into engagement with the belt so that as the cradle approaches dumping position, the boxes will lie on their lower sides on the belt. Accordingly, the belt will then serve to feed the boxes forwardly.

As the cradle 14 reaches the end of its throw to dumping position, one of the legs 52 thereof will, as previously described, engage the head 58 of the switch rod 57 and, as the cradle comes to rest supported at its forward end by the shelf 49, depress said rod and swing the lever 56 with the result that the switch 55 will be opened. The magnetic clutch 39 will accordingly be deenergized and swinging of the cradle stopped.

The cradle 14 will then be retained in dumping position by the weight of the boxes 53 thereon and while in said position the belt 26 will continue in operation to feed the boxes forwardly so that said boxes will be moved in sequence onto the apron 50 to dump the contents thereof onto the conveyor 48. As the boxes, one by one, reach the apron and are dumped, the attendant will place the empty box upon the conveyor 51 which will return the empty boxes for reuse.

When the last empty box is removed from the cradle 14, the cradle will then return by gravity to upright loading position and as the cradle swings, the trip arm 63 wil again engage the switch lever 62 and return said lever to its original position for opening the switch 61. The motor 35 will accordingly be deenergized so that the feed belt 26 will be stopped.

It will accordingly be seen that the movement of the cradle 14 from loading to dumping position is entirely under the control of the attendant, and since the cradle is returned to loading position by gravity, the attendant may also control the return of the cradle manually. Furthermore, since the attendant is not required to lift the filled boxes, but only to handle the empty boxes, the work will not be arduous and a single attendant may, while either of two machines standing side by side is loading, attend to the dumping of a stack of boxes by the other machine.

Since the cradle 14 is limited at the end of its throw to dumping position by the shelf 49, provision is made for automatically cutting off the torque on the cradle, as previously described, so as to avoid injury to the machine, as would otherwise result. As will be noted, the starting and stopping of the feed belt 26 is also automatic. Obviously, if the feed belt is started too soon before the cradle reaches dumping position, the fruit in the boxes 53 will be spilled, and it is also important that the belt be at rest when the cradle is at loading position so that a careless workman may not jam a stack of boxes against the belt when moving. It is accordingly conceived that the trip arm 63 shall be adjustable in position so as to strike the switch lever 62 either earlier or later as regards the throw of the cradle and a selected best position for the arm thus chosen for starting and stopping the feed belt.

Having thus described my invention, what I claim is:

1. In a box dumping machine, the combination of a cradle pivoted medially of its length but heavier at one end thereof than the other and movable by gravity to automatically return from substantially horizontal dumping position to substantially vertical loading position to receive a stack of boxes thereon, a motor for rocking the cradle to dumping position, means for automatically de-energizing said motor as the cradle reaches dumping position and freeing the cradle to return by gravity to loading position, a conveyor belt carried by the cradle, a motor for driving said belt, and means for energizing said last mentioned motor after the cradle has crossed the pivotal center thereof when moving to dumping position for operating the belt and shifting the boxes toward the lighter end of the cradle to be dumped and thereby diminishing the weight of the boxes at the heavier end of the cradle and increasing the weight of the boxes at the lighter end of the cradle for maintaining the cradle in dumping position while the boxes are being dumped.

2. In a box dumping machine, the combination of a cradle pivoted medially of its length but heavier at one end thereof than the other and movable by gravity to automatically return from substantially horizontal dumping position to substantially vertical loading position to receive a stack of boxes thereon, a motor for rocking the cradle to dumping position, a shelf disposed for engagement by the lighter end of the cradle limiting the cradle in dumping position, a switch connected with said shelf and provided with a lever, a rod connected to one end of said lever and slidably received through said shelf, the rod being engageable by the lighter end of the cradle for opening the switch and automatically de-energizing said motor as the cradle reaches dumping position thereby freeing the cradle to return by gravity to loading position, a second rod connected to the opposite end of said lever, a foot lever connected to the latter rod and operable to close said switch and energize the motor for rocking the cradle to dumping position, a conveyor belt carried by the cradle, a motor for driving said belt, and means for automatically energizing said last mentioned motor after the cradle has crossed the pivotal center thereof when moving to dumping position for operating the belt and shifting the boxes toward the lighter end of the cradle to be dumped and thereby diminishing the weight of the boxes at the heavier end of the cradle and increasing the weight of the boxes at the lighter end of the cradle for maintaining the cradle in dumping position while the boxes are being dumped.

FLOYD J. McMICHAEL.